(12) United States Patent
Komori

(10) Patent No.: US 8,285,106 B2
(45) Date of Patent: Oct. 9, 2012

(54) INFORMATION PROCESSING APPARATUS

(75) Inventor: Yoko Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1470 days.

(21) Appl. No.: 11/888,042

(22) Filed: Jul. 31, 2007

(65) Prior Publication Data

US 2007/0286572 A1      Dec. 13, 2007

Related U.S. Application Data

(62) Division of application No. 10/255,316, filed on Sep. 26, 2002, now Pat. No. 7,274,862.

(30) Foreign Application Priority Data

Sep. 27, 2001   (JP) ................................ 2001-295423

(51) Int. Cl.
*H04N 5/932* (2006.01)
*H04N 5/931* (2006.01)
*H04N 5/935* (2006.01)

(52) U.S. Cl. ......... 386/201; 386/203; 386/207; 386/214

(58) Field of Classification Search .................. 386/201, 386/203, 207, 214
See application file for complete search history.

(56) References Cited

U.S. PATENT DOCUMENTS

| | | | |
|---|---|---|---|
| 3,997,876 A * | 12/1976 | Frush ............................... 360/27 |
| 5,172,357 A * | 12/1992 | Taguchi ..................... 369/47.28 |
| 5,982,447 A * | 11/1999 | Nakamura ..................... 348/515 |
| 5,999,905 A | 12/1999 | Isozaki |
| 6,212,208 B1 | 4/2001 | Yoneda et al. |
| 6,542,564 B2 * | 4/2003 | Cho ............................... 375/372 |
| 6,681,077 B1 | 1/2004 | Murase et al. |
| 6,769,094 B2 | 7/2004 | Loesch et al. |
| 6,907,081 B2 * | 6/2005 | Mantchala et al. ....... 375/240.26 |
| 6,993,081 B1 * | 1/2006 | Brunheroto et al. ...... 375/240.28 |
| 7,023,924 B1 * | 4/2006 | Keller et al. .............. 375/240.26 |
| 7,031,348 B1 * | 4/2006 | Gazit ............................. 370/504 |
| 7,061,983 B2 * | 6/2006 | Takahashi ................. 375/240.26 |
| 7,274,862 B2 * | 9/2007 | Komori .......................... 386/207 |
| 2001/0031136 A1 * | 10/2001 | Kawamura et al. .............. 386/98 |
| 2002/0172281 A1 * | 11/2002 | Mantchala et al. ....... 375/240.12 |
| 2003/0147561 A1 * | 8/2003 | Faibish et al. ................. 382/245 |
| 2007/0022378 A1 | 1/2007 | Hamada |

FOREIGN PATENT DOCUMENTS

| | | |
|---|---|---|
| JP | 5 167995 | 7/1993 |
| JP | 7-170490 | 7/1995 |
| JP | 11-112944 | 4/1999 |
| JP | 2000 165862 | 6/2000 |

* cited by examiner

*Primary Examiner* — Helen Shibru

(74) *Attorney, Agent, or Firm* — Frommer Lawrence & Haug LLP; William S. Frommer

(57) ABSTRACT

Audio data is prevented from not synchronizing with video data when splicing. A first GOP of a video stream of a second program is spliced to a last GOP of a video stream of a first program. A first GOP of an audio stream of the second program is spliced to a last GOP of an audio stream of the first program. In this case, a gap amount PTS_FS required for synchronizing video data and audio data after the splicing is computed for each GOP. For the splicing processing, a gap amount PTS_FS_SPLYCE caused when the last GOP is spliced to the first GOP directly and the PTS_FS are used.

5 Claims, 14 Drawing Sheets

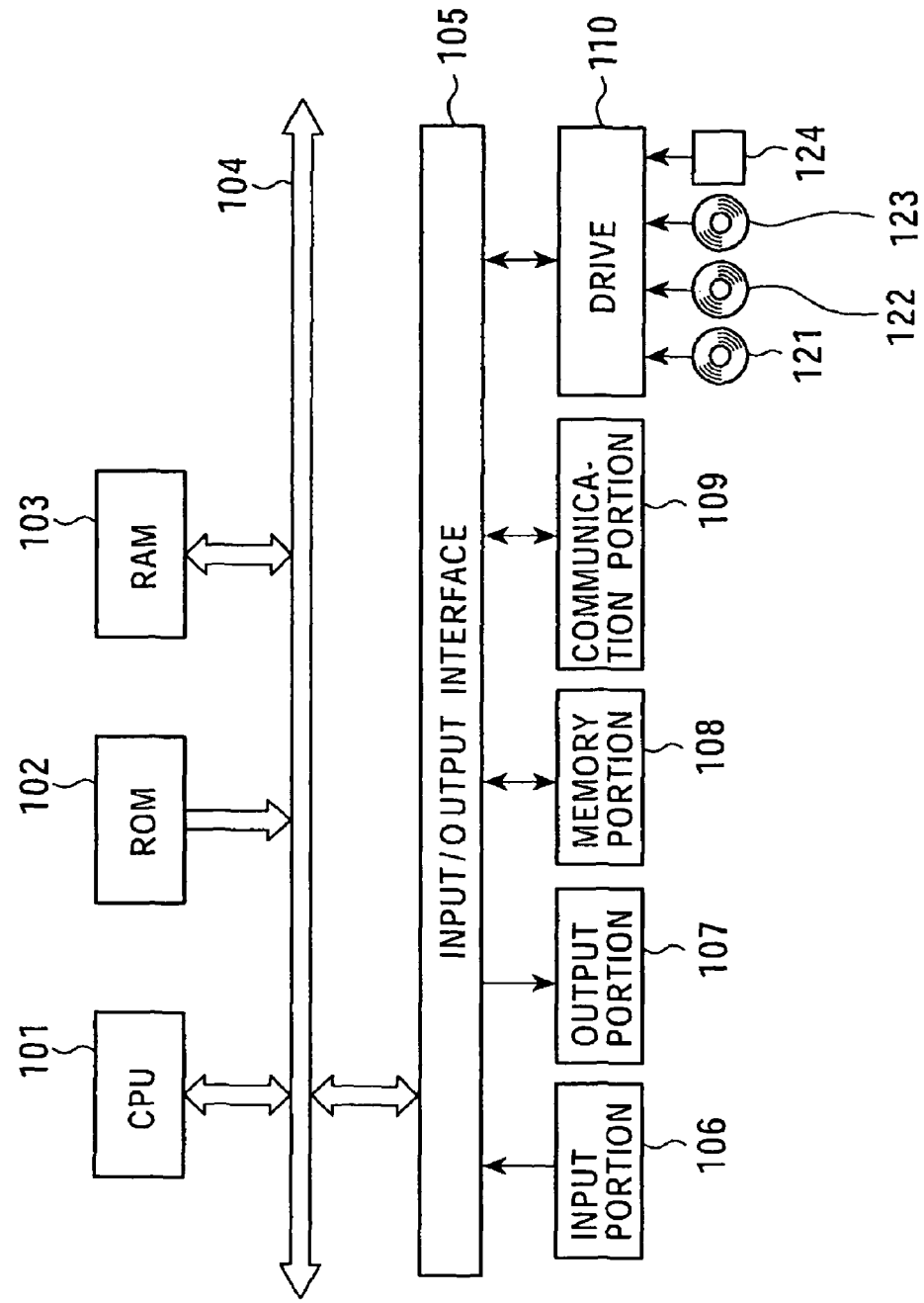

INFORMATION PROCESSING APPARATUS

This is a division of application Ser. No. 10/255,316, filed Sep. 26, 2002 now U.S. Pat. No. 7,274,862, with a claim of priority to Japanese application 2001-295426, filed in Japan Sep. 27, 2001, the entirety thereof being incorporated herein by reference.

BACKGROUND OF THE INVENTION

1. Field of the Invention

The present invention relates to an information processing apparatus, more particularly, to an information processing apparatus suitable for suppressing storage of gaps caused by a difference in size of processing units for a video stream and an audio stream when these streams are coupled in digital broadcasting.

2. Description of the Related Art

The digital broadcasting for broadcasting programs digitally has been widely spread. A program in digital broadcasting further includes one or more programs. Each of the programs is exchanged by using a transport stream by MPEG (Moving Picture Expert Group) 2.

By the way, in digital broadcasting, different TV programs are broadcasted depending on time zones. Therefore, after a transport stream is converted to an elementary stream, one program must be switched to the next program in certain timing. Also in one program, a commercial (which is also a program) may have to be inserted during a main program. Splicing processing is needed for connecting elementary streams corresponding to the main program and the commercials when switching from one TV program to the other or switching from a TV program to a commercial.

Units (a video frame and an audio frame) for encoding a video stream and an audio stream, respectively multiplexed to an elementary stream are different time intervals from each other. FIG. 1 is a diagram for explaining a difference in length of a video stream and an audio stream included in a program. As shown in FIG. 1, one frame (video frame) of a video stream is 33 ms according to NTSC method. One frame (audio frame) of an audio stream is 24 ms. Therefore, even when the video frame of the video stream and the audio frame of the audio stream are synchronized at the beginning of the program, the timing of the second and following video frames and audio frames do not match. As a result, a time gap occurs.

Since the encoding unit is a frame, an appreciable gap highly possibly occurs at the ends of the video stream and of the audio stream at the end of a program of one TV program. In other words, the end of a frame of an audio stream is hardly located just at a splicing point of a video stream (a splicing point of video streams of different programs). That is, a gap may occur between the audio stream and the video stream.

As shown in FIG. 1, a video stream and an audio stream, which have a gap in time, are spliced in the last frame of a program. Then, in a program created by the splicing, the video frame and the audio frame may not be synchronized. As a result, by repeating splicing, gap amounts are accumulated, producing a larger gap amount gradually.

SUMMARY OF THE INVENTION

The present invention was made in view of these conditions. It is an object of the present invention to suppress accumulation of gaps of audio frames with respect to video frames due to splicing processing. It is another object of the present invention to reconstruct audio data surely.

It is another object of the present invention to provide an information processing apparatus including an ending time information calculating device for calculating ending time information of the processing unit of the input video data and ending time information of the processing unit of the input audio data from the input video data in the processing unit and the input audio data in the processing unit, a first gap amount information calculating device for, when the input video data in the processing unit and the input audio data in the processing unit are spliced to previous processing units directly, calculating, for each of the processing units, first gap amount indicating a gap amount between the input video data in the processing unit and the input audio data in the processing unit for synchronizing the input video data in the processing unit and the input audio data in the processing unit, a second gap amount information calculating device for calculating, for each of the processing units, second gap amount information indicating a second gap amount between ending time information of the video data in the previous processing unit and the input audio data in the processing unit for synchronizing the input audio data in the processing unit and the input video data in the processing unit, and a mute data inserting device for, when the second gap amount is larger than the first gap amount, inserting mute information indicating a mute between the previous audio data and the input audio data for each of the processing unit.

BRIEF DESCRIPTION OF THE DRAWINGS

FIG. 16 is a diagram for explaining a medium.

DESCRIPTION OF THE PREFERRED EMBODIMENTS

Figure 2:
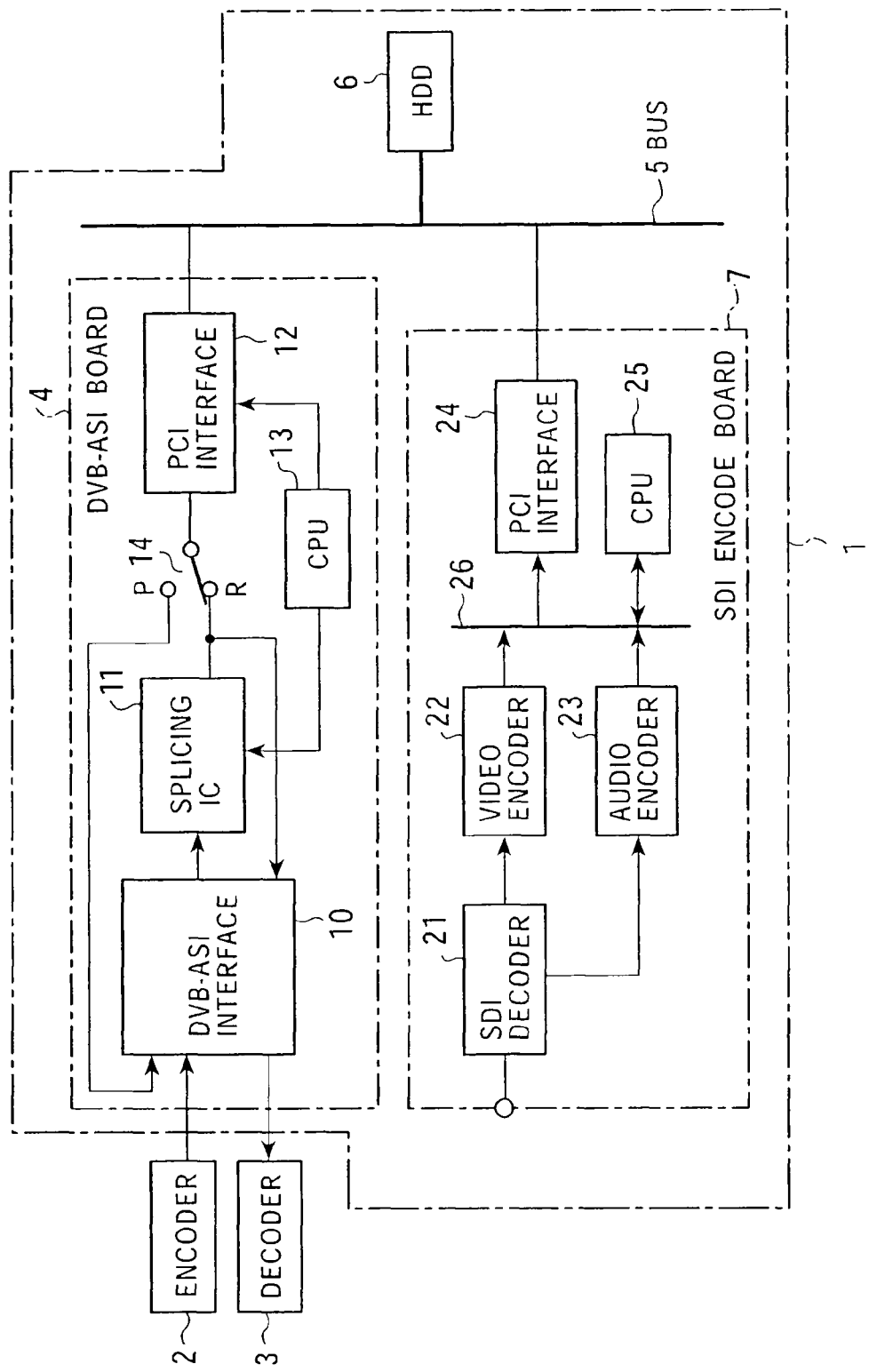
FIG. 2 is a block diagram showing a construction of one embodiment of a video server according to the present invention.

Embodiments of the present invention will be described below with reference to drawings. FIG. 2 is a diagram showing a construction of one embodiment of a video server 1 according to the present invention. The video server 1 is an apparatus used for splicing different programs of a TV program and/or for inserting a commercial during a broadcasted TV program, for example.

An encoder 2 and a decoder 3 are connected to the video server 1. Video data and/or audio data encoded by an encoding method such as MPEG 2 are input to a Digital Video Broadcasting-Asynchronous Serial Interface (DVB-ASI) board 4 in a transport form. The DVB-ASI board 4 includes a DVB-ASI interface 10, a splicing IC (Integrated Circuit) 11, a PCI (Peripheral Component Interconnect) interface 12, a CPU (Central Processing Unit) 13 and a switch 14.

The DVB-ASI interface 10 interfaces between the encoder 2 and the splicing IC 11 and interfaces between the splicing IC 11 and the decoder 3. The splicing IC 11 splices programs by GOP (Group of Pictures). In this case, an appreciable gap is prevented from occurring between a video stream and an audio stream (the detail will be described later).

The PCI interface 12 controls data communication with the others, such as a hard disk drive (HDD) 6 through a bus 5 in the video server 1. The CPU 13 controls the DVB-ASI board 4. A program stored in the HDD 6 is read as required and is processed by the DVB-ASI board 4. Then, the program is supplied to the decoder 3, where the program is decoded and is output to an apparatus (not shown) connected to the subsequent stage. The switch 14 is controlled by the CPU 13. When the splicing IC 11 outputs to the PCI interface 12 (recording mode), the switch 14 is turned to a contact R side. On the other hand, an output of the PCI interface 12 is supplied to the DVB-ASI interface 10 (play-mode), the switch 14 is turned to a contact P side.

A serial digital interface (SDI) encode board 7 is also connected to the bus 5 in the video server 1. The SDI encode board 7 has an interface for inputting serial data. The SDI encode board 7 includes an SDI decoder 21 for decoding input data, a video encoder 22 for encoding video data output from the SDI decoder 21, an audio encoder 23 for encoding audio data output from the SDI decoder 21, a PCI interface 24 for controlling to supply data output from the encoder to the HDD 6, a CPU 25 for controlling components of the SDI encode board 7, and a bus 26 for connecting the components to each other.

Figure 3:
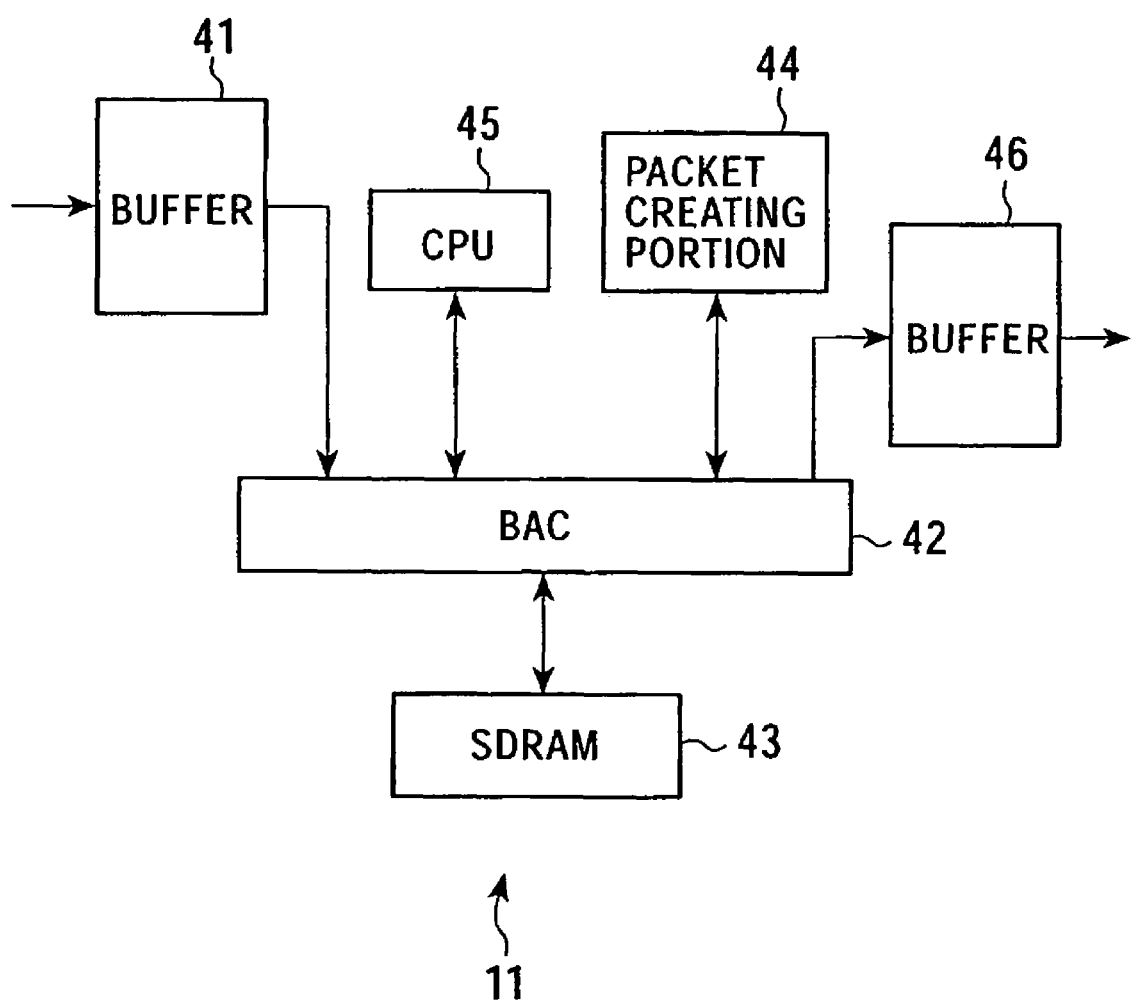
FIG. 3 is a block diagram showing an example of an internal construction of a splicing IC in FIG. 2.

FIG. 3 is a diagram showing an internal construction of the splicing IC 11. A buffer 41 temporarily stores data from the encoder 2 or the PCI interface 12 input through the DVB-ASI interface 10. The stored data is output to a bus arbitration control module (BAC) 42. The BAC 42 controls data communication with synchronous dynamic random access memory (SDRAM) 43. The data stored in the SDRAM 43 is supplied to a packet creating portion 44 through the BAC 42.

Data locally-formatted by the packet creating portion 44 is supplied to a buffer 46 through the BAC 42. The data supplied to the buffer 46 is supplied to the HDD 6 through the switch 14 and the PCI interface 12 (recording mode) as required. Alternatively, the data is supplied to the decoder 3 through the DVB-ASI interface 10 (play mode) as required.

Figure 4:
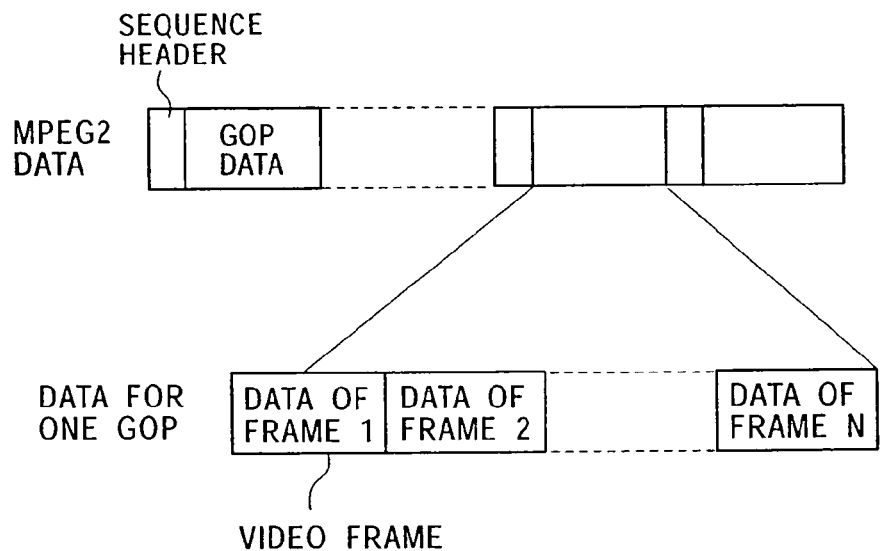
FIG. 4 is a diagram for explaining GOP.

Before explaining an operation by the video server 1 having the construction, an elementary stream of the MPEG 2, which will be needed for the following explanation, will be described. FIG. 4 shows a hierarchical structure of data in an elementary stream of the MPEG 2. Data us encoded by GOP (Group of Pictures). A sequence header is located at the beginning of each GOP. One GOP is N video frames (where N is a positive integer, and generally N=15). One video frame is 33 ms long in NTSC method.

At least one frame (I-picture), which can be reconstructed independently from the previous and subsequent frames, must be included in one GOP of video data. One GOP is reconstructed based on the I-picture. The minimum unit of the reconstruction is one GOP. Splicing processing is implemented by GOP. Therefore, the length of a program to be spliced is integer times of one GOP.

Audio data synchronizing one GOP data of video data is dealt as one GOP. One unit of audio data is a frame of 24 ms long (audio frame). M audio frames are included in one GOP (where M is an integer, and generally M=21).

Figure 5:
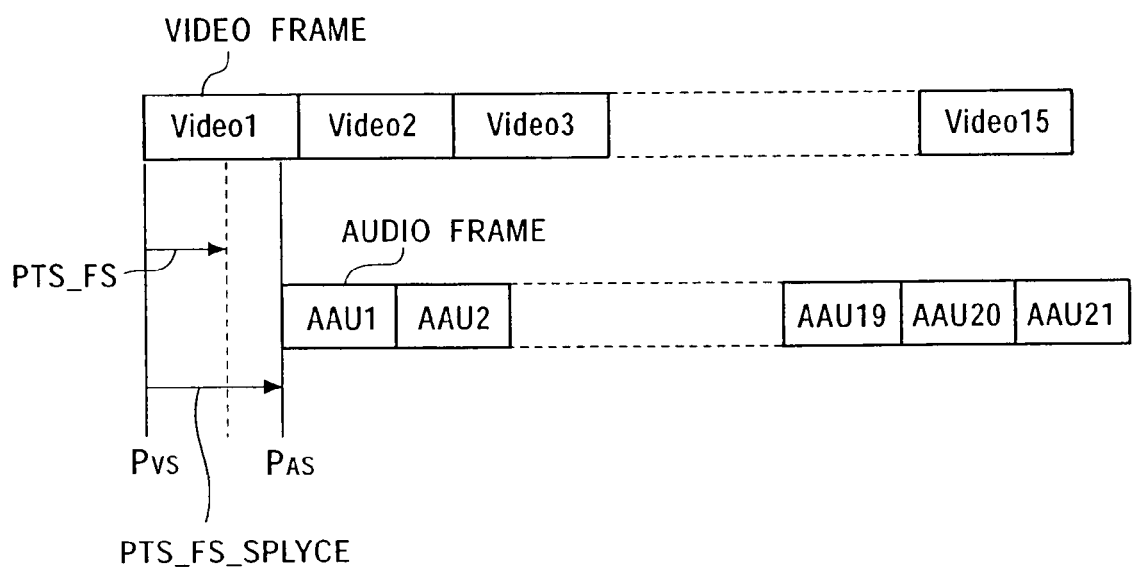
FIG. 5 is a diagram for explaining a gap amount between a video frame and an audio frame in splicing.
Figure 6:
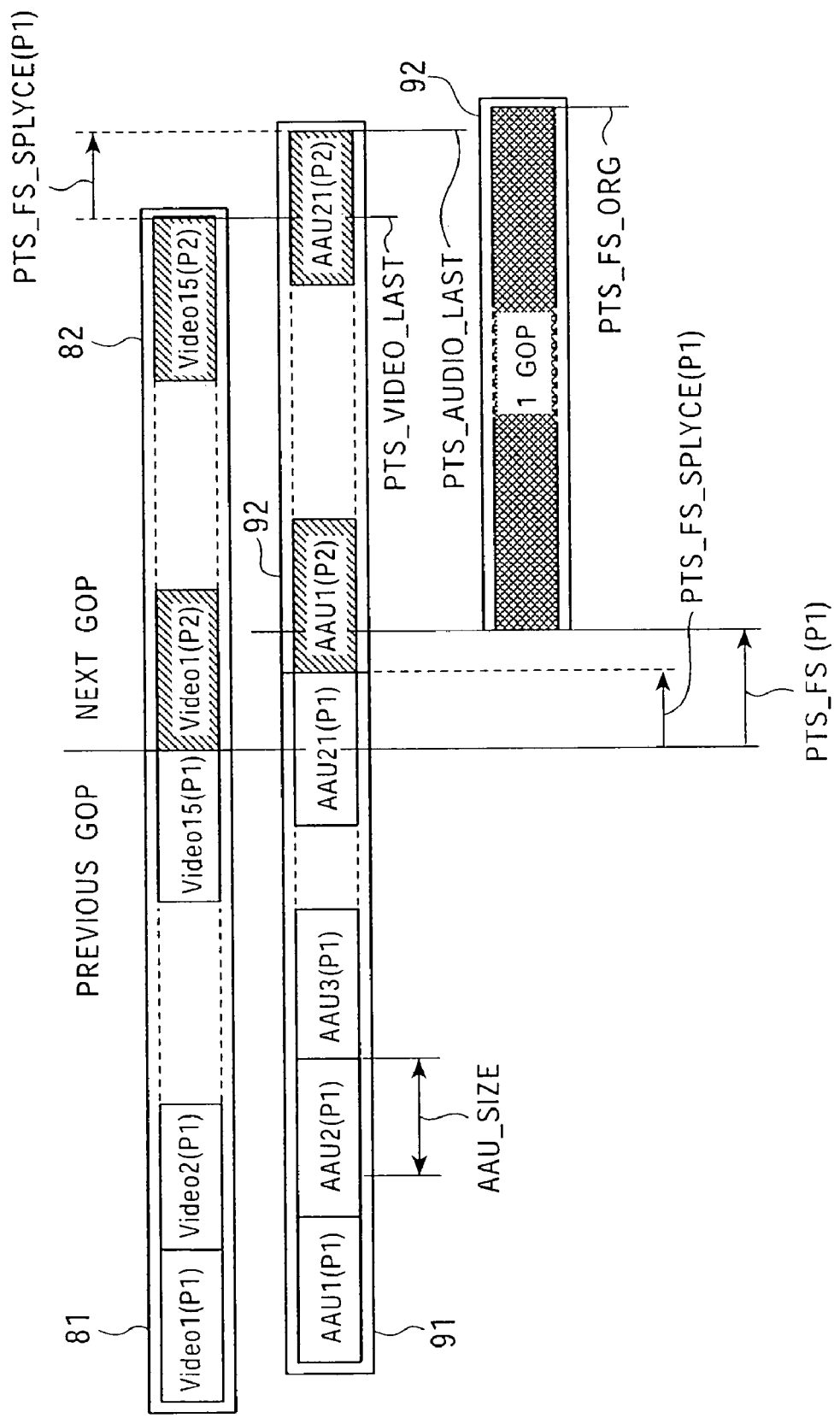
FIG. 6 is a diagram for explaining frames in splicing.

FIGS. 5 and 6 are diagrams each for explaining a gap caused by synchronizing a video frame and an audio frame. As shown in FIG. 5, an audio frame needs to have a gap amount PTS_FS with respect to a video frame at the beginning of a GOP in order to output audio data in synchronous with video data. Here, "synchronization" means outputting one GOP of audio data simultaneously with a corresponding GOP of video data. FIG. 5 shows 15 video frames (Video 1, Video 2, . . . and Video 15) for one GOP and 21 audio frames (AAU 1, AAU 2, . . . and AAU 21) for one GOP. A point PVS indicates a beginning position of video data for one GOP (beginning position of the video frame Video 1). A point PAS indicates a beginning position of audio data for one GOP (beginning position of the audio frame AAU 1). Therefore, a difference in a time axis between the points $P_{AS}$ and $P_{VS}$ (a phase difference produced by subtracting a time at the point $P_{VS}$ from a time at the point $P_{AS}$) is a gap amount between an audio frame and a video frame in the GOP.

PTS_FS indicates an original gap amount in a gap amount produced by subtracting a time at the beginning of a first video frame from a time at the beginning of a first audio frame. Due to the existence of the gap amount, the video data and the audio data can be played synchronously. In other words, when an audio frame is displaced from a video frame by PTS_FS at the beginning of a GOP, the audio data is reconstructed in synchronous with the video data. When the displaced amount is not PTS_FS, the audio data is not reconstructed in synchronous with the video data.

Figure 1:
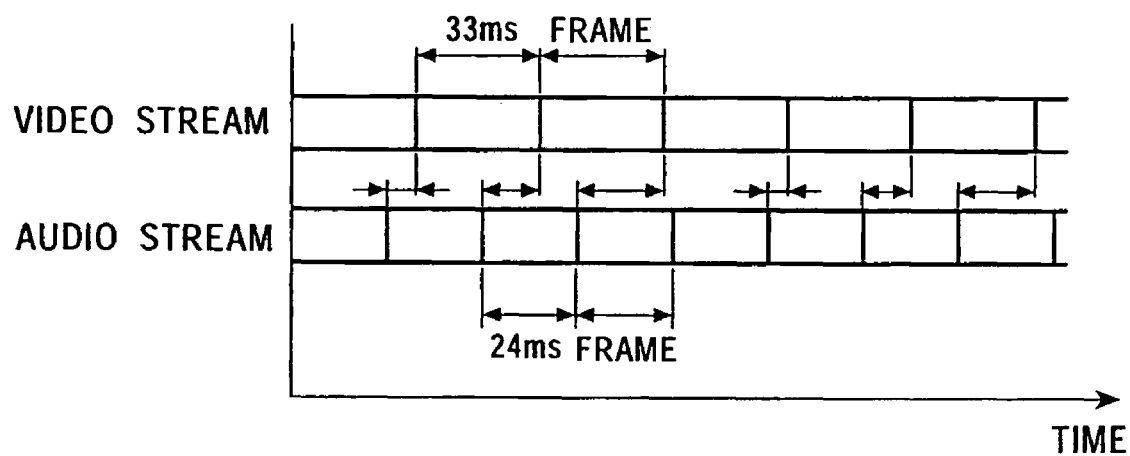
FIG. 1 is a diagram for explaining an amount of displacement due to a difference in frame length of a video stream and an audio stream.

As described with reference to FIG. 1, an audio frame and a video frame are different in length from each other. Therefore, even when the video data and the audio data are synchronized (called "AV synchronization" herein after as necessary) at the beginning of a program (even when timing is adjusted such that the audio data can be output in synchronous with the video data), a gap may exist between the video data and the audio data at the end of the program. When one program (called "first program") including such a gap between video data and audio data is spliced with another program (called "second program" hereinafter), the gap affects on the second program.

According to the present invention, video data and audio data are spliced by GOP sequentially and repeatedly. Then, the video data and the audio data are output in series. Here, it is not determined whether or not the next GOP to be processed belongs to the same program as that of the precious GOP. As a result, the same processing is performed on the next GOP regardless of whether the next GOP belongs to the same program or not.

When the next GOP belongs to the same program as that of the previous GOP, the audio frame is generally adjusted so as to synchronize with the video frame, that is, such that the gap can be PTS_FS. However, when the next GOP belongs to a different program from that of the previous GOP, the audio frame is generally not synchronized with the video frames as shown in FIG. 6.

According to the present invention, as shown in FIG. 6, when the next GOP is spliced with the previous GOP as it is (when the next GOP is spliced without changing and/or adjusting a displaced amount of the audio data with respect to the video data), a gap amount between a next GOP 82 of the video data and a next GOP 92 of the audio data is PTS_FS_SPLYCE.

In FIG. 6, the video frames Video 1 (Pi) to Video 15 (P1) without hatching are video frames of the previous GOP 81 (video frames of the GOP to be spliced). Video frames Video 1 (P2) to Video 15 (P2) with hatching are video frames of the next GOP 82 (video frames of the GOP to splice).

The audio frames AAU 1 (P1) to AAU 21 (P1) without hatching are audio frames of the previous GOP 91 (audio frames of the GOP to be spliced). Audio frames AAU 1 (P2) to AAU 21 (P2) with hatching are audio frames of the next GOP 92 (audio frames of the GOP to splice).

As shown in FIG. 6, when the next GOP is spliced to the previous GOP directly, the end of the last video frame Video 15 (P2) of the next GOP 82 is PTS_VIDEO_LAST. The end of the last audio frame of the next GOP 92 is PTS_AUDIO_LAST. When a displaced amount of the video frame of the next GOP 82 with respect to the audio frame of the next GOP 92 is PTS_FS, that is, PTS_AUDIO_LAST produced when the first program and the second program are synchronized (when the audio frame of GOP 92 is synchronized with the video frame of the GOP 82) is PTS_FS_ORG.

The gap amount PTS_FS and the gap amount PTS_FS_SPLYCE vary for every GOP. Since the gap amount in FIG. 6 is with respect to the last GOP 81 and GOP 91 of the first program, the gap amount PTS_FS and the gap amount PTS_FS_SPLYCE are shown as gap amounts PTS_FS (P1) and PTS_FS_SPLYCE (P1), respectively. Here, the PTS_FS (P1) is stored in Audio_Header 63 (in FIG. 7 described later) including video frame data of the GOP 81 and the audio frame data of the GOP 91 as VIDEO/AUDIO data 64.

Figure 7:
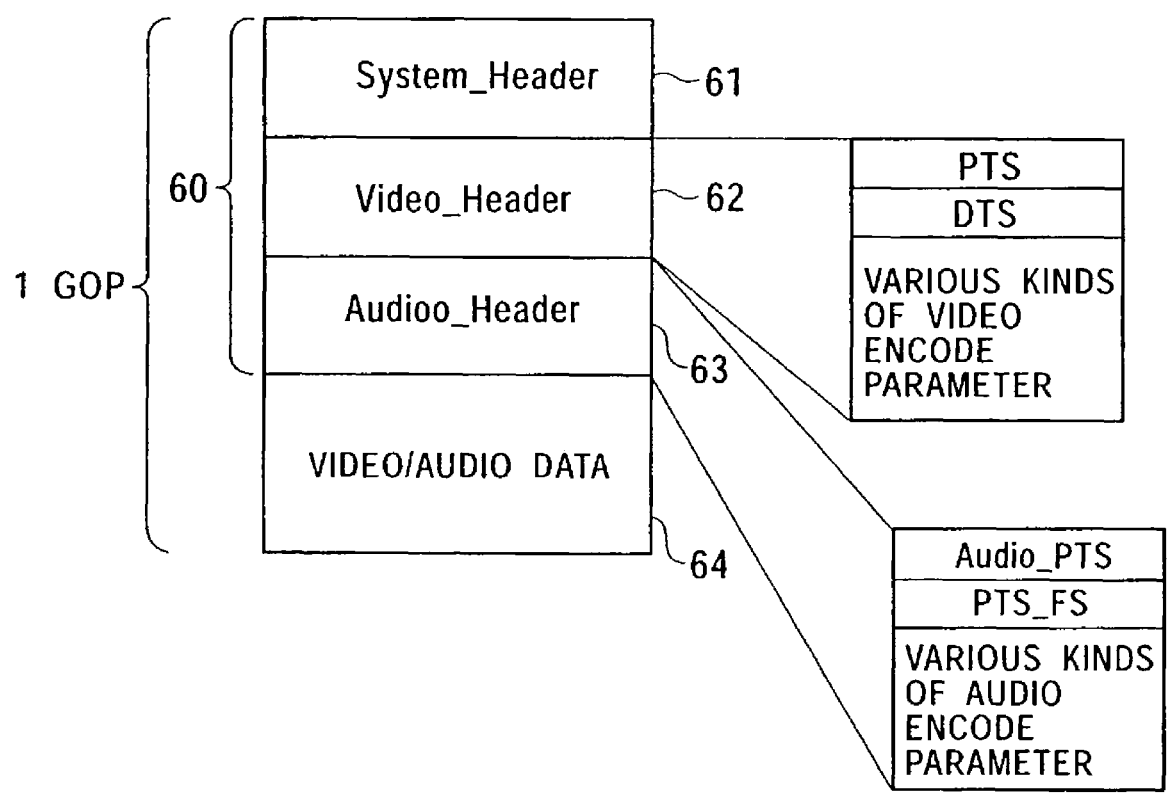
FIG. 7 is a diagram for explaining a construction of a local header.

When the CPU 45 of the splicing IC 11 stores data input from the encoder 2 into the HDD 6, the data is converted into the local format. The data in the local format is divided into blocks by one GOP and is recorded (the detail of the recording processing will be described later with reference to a flowchart in FIG. 8). Each block is provided with a local header including information required for decoding. As shown in FIG. 7, data for one GOP includes a local header 60 and VIDEO/AUDIO data 64. The local header 60 includes a System_Header 61, a Video_Header 62 and an Audio_Header 63.

The System_Header 61 includes positional information indicating positions of the Video_Header 62, the Audio_Header 63 and the VIDEO/AUDIO data 64 in this block and information on a time for playing by the Recording Unit.

The Video_Header 62 includes information (Video_PTS) indicating PTS (Presentation Time Stamp) and information (Video_DTS) indicating DTS (Decoding Time Stamp) of video frames of one GOP and information such as parameters relating to different kinds of Video encoding. A value counting STC (System Time Clock) by having the first video frame as the initial value zero (0) for recording is stored as the PTS and the DTS. The Audio_Header 63 includes information indicating Audio_PTS of audio frames of one GOP, information indicating PTS_FS, and information on a parameter (for example, a sampling frequency and the number of channels) relating to different kinds of audio encoding. Since the presentation time stamp of audio data is equal to the decoding time stamp, Audio_PTS is also Audio_DTS. A value counting STC by having the first audio frame as the initial value zero (0) for recording is stored as the Audio_PTS.

The VIDEO/AUDIO data 64 includes actually encoded video data and audio data.

Figure 8:
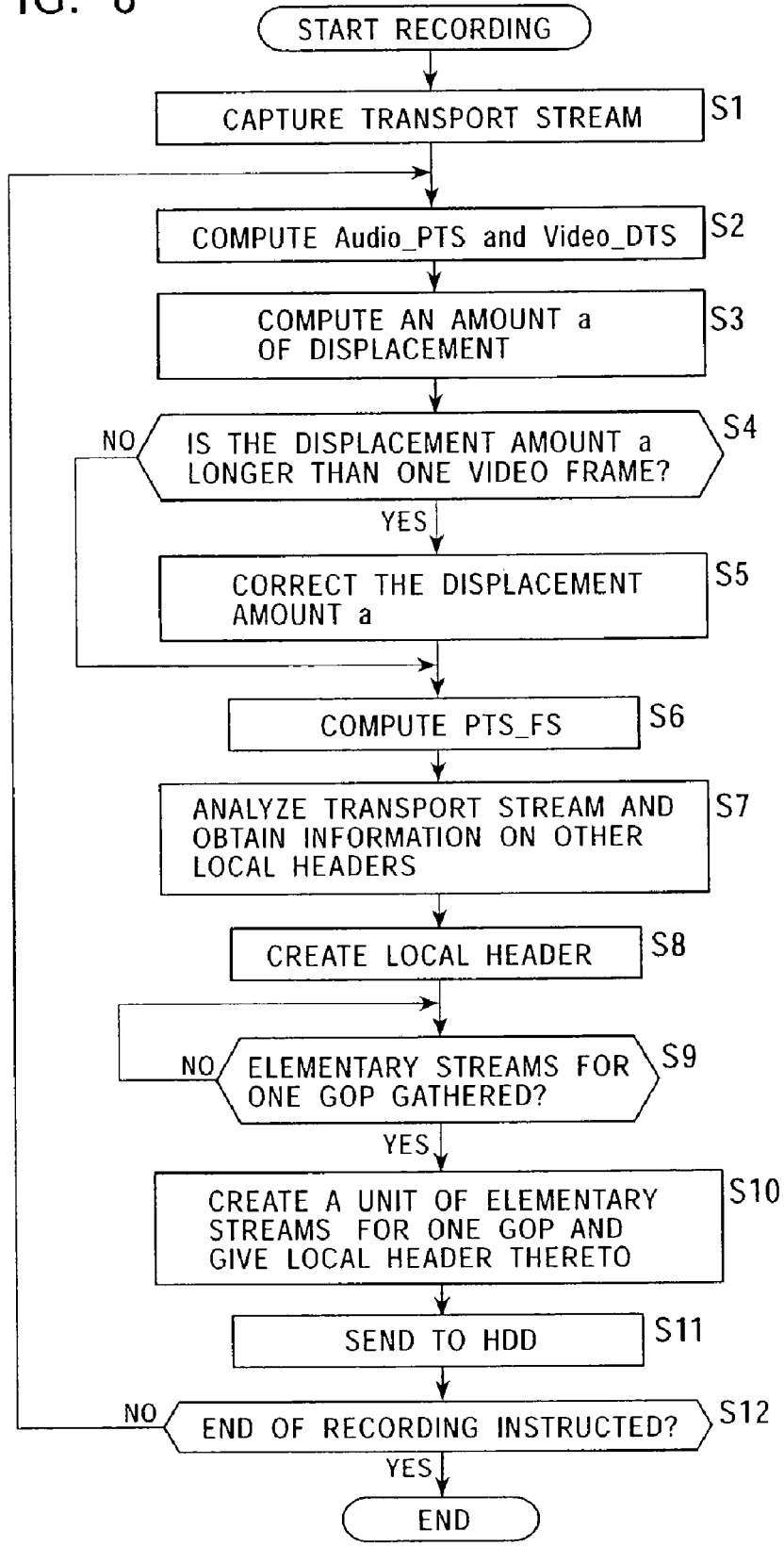
FIG. 8 is a flowchart for explaining processing for recording.

Next, an operation by the splicing IC 11 for recording in the HDD 6 data encoded by the encoder 2 will be described with reference to the flowchart in FIG. 8.

At a step S1, the CPU 45 of the splicing IC 11 captures a transport stream. In other words, the encoder 2 outputs a transport stream including encoded video data and audio data to the DVB-ASI board 4 by, for example, MPEG 2 method. The DVB-ASI interface 10 of the DVB-ASI board 4 supplies the transport stream input by the encoder 2 to the splicing IC 11. The splicing IC 11 captures the transport stream.

The buffer 41 of the splicing IC 11 temporarily stores the data supplied by the encoder 2 through the DVB-ASI interface 10 and then supplies the data to the BAC 42. The BAC 42 supplies and stores the data into the SDRAM 43. The CPU 45 reads data written in the SDRAM 43 and converts the transport stream to an elementary stream.

Next, at a step S2, the CPU 45 computes time stamps Audio_PTS and Video_DTS of the elementary stream converted at the step S1. More specifically, the CPU 45 counts the number of GOP's from the first video frame in the video stream. Then, the value obtained by counting the STC (System Time Clock) with the beginning position of the first video frame of the first GOP as the initial value zero (0) is set as the time stamp Video_DTS. Therefore, the time stamp Video_DTS in processing the first GOP is zero (0).

Similarly, the CPU 45 counts the number of GOP's from the first audio frame in the audio stream. Then, the value obtained by counting the STC (System Time Clock) with the beginning position of the first audio frame of the first GOP as the initial value zero (0) is set as the time stamp Audio_PTS. Therefore, the time stamp Audio_PTS in processing the first GOP is zero (0).

Next, at a step S3, the CPU 45 computes a displaced amount a of audio data with respect to video data based on the time stamp computed at the step S2 by using the following equation:

$$a = Audio\_PTS - Video\_DTS \quad (1)$$

After the displaced amount a of the GOP to be processed is computed at the step S3, the CPU 45, at a step S4, determines whether the displaced amount a obtained by computing at the step S3 is longer than the length of one video frame (a unit of encoding) or not. The length of one video frame is an STC (System Time Clock) count value at the frequency of 90 kHz and is 3003 (=90000/29.97). If the displaced amount obtained at the step S3 is longer than the length (3003) of one video frame, the processing goes to a step S5. There, the CPU 45 corrects the displaced amount a by computing the length of one video frame based on the displaced amount a obtained at the step S3 by using the following equation:

$$a = a - 3003 \quad (2)$$

A video frame to be synchronized with an audio frame is searched in this way. That is, a video frame apart from a given audio frame by one or more video frame is not synchronized with the given audio frame (a video frame to be synchronized is apart by a distance shorter than one video frame). Thus, the displaced amount a is corrected.

If, at the step S4, the displaced amount a obtained at the step S3 is not longer than the length of one video frame, the processing at the step S5 is skipped. In this case, the displaced amount a computed at the step S3 is held as a value indicating a displaced amount directly as shown in the following equation:

$$a = Audio\_PTS - Video\_DTS \quad (3)$$

Next, at a step S6 the CPU 45 computes a displaced amount PTS_FS by using the next equation:

$$PTS\_FS = ((a \times 48000)/90000) \,\&\, 0x7f\!f \quad (4)$$

In the equation, 90000 is an STC frequency. By dividing with this value, the displaced amount a is converted to seconds. By multiplying the value converted to seconds by 48000, the displaced amount is converted to a value corresponding to an audio sampling clock. The value "48000"

corresponds to a sampling frequency of audio data. If the sampling frequency of the audio data is the other frequency as a result of analyzing the transport stream, the value is used.

The "&0x7ff" means processing for capturing only valid digits by masking. In this case, the data in the lower 11 bits are captured. This is because the displaced amount can be expressed by 11 bits or below at maximum. Thus, the number of bits of a parameter expressing a phase shift is prevented from being larger than necessary.

At a step S7, the CPU 45 analyzes the transport stream and obtains information on the other local header. In other words, data required for recording the System_Header 61, the Video_Header 62, and the Audio_Header 63 shown in FIG. 7 is obtained. In this case, the CPU 45 obtains a sampling frequency (in this example, 48 kHz) for audio data as one of various audio encode parameters of the Audio_Header 63.

At a step S8, the CPU 45 transfers the parameter created and obtained through the previous steps to the packet creating portion 44. Then, the CPU 45 causes the packet creating portion 44 to create the local header 60. In other words, the System_Header 61, the Video_Header 62 and the Audio_Header 63 in FIG. 7 are created.

At a step S9, the CPU 45 determines whether all of the elementary streams for one GOP are obtained or not. If not, the CPU 45 waits for that all of them are obtained.

At the step S9, if it is determined that all of the elementary streams for one GOP are obtained, the processing goes to a step S10 where the CPU 45 supplies the data to the packet creating portion 44. The packet creating portion 44 stores the supplied data in the VIDEO/AUDIO data 64 and creates a block for one GOP. Then, the packet creating portion 44 provides the local header created at the step S8 to the block.

At a step S11, the CPU 45 transfers the data in the block for one GOP, which is created by the packet creating portion 44 at the step S10 and has the local header 60, to the buffer 46.

The buffer 46 receives the block data for one GOP transferred from the packet creating portion 44. Then, the buffer 46 temporarily stores and then outputs the block data for one GOP.

The data output from the buffer 46 is supplied to the PCI interface 12 through a switch 14, which is turned to the contact R side by the CPU 13 at that time. The PCI interface 12 transfers the data input by the switch 14 to the HDD 6 through the bus 5. Then, the PCI interface 12 causes the HDD 6 to record the data.

Next, at a step S12, the CPU 45 determines whether the recording processing is instructed to end by a user or not. If not instructed, the processing returns to the step S2, where the next GOP is obtained, and the same processing is performed on the GOP. At the step S12, if it is determined that the recording processing is instructed to end by the user, the CPU 45 ends the processing.

In this way, data is divided into blocks (local blocks) in GOP as a recording unit in the local format as shown in FIG. 7. Then, the blocks are recorded in the HDD 6.

Accordingly, when the data recorded in the HDD 6 is instructed by the user later, the data is read out from the HDD 6. After splicing processing is performed on the data by the DVB-ASI board 4, the data is converted from the elementary stream to the transport stream. The transport stream is supplied to the decoder 3, which decodes and outputs the transport stream to an apparatus, not shown.

In other words, a controller, not shown, of the video server 1 receives a play list in which programs specified by a user aligned in the play order. Then, the controller reads out data for the programs from the HDD 6 in accordance with the play list and transfers the data to the splicing IC 11 for every one FOP. The splicing IC 11 performs splicing processing thereon.

Next, the splicing processing performed by the splicing IC 11 (FIGS. 2 and 3) will be described with reference to a flowchart in FIG. 9. The processing here is performed in GOP.

At a step S31, MPEG 2 data for one GOP (one block shown in FIG. 7) is read out from the HDD 6 and is input to the PCI interface 12 through the bus 5. The PCI interface 12 outputs the input data to the DVB-ASI interface 10 through the switch 14, which is turned to the contact P side by the CPU 13 at that time. The DVB-ASI interface 10 supplies the data input by the switch 14 to the splicing IC 11. The MPEG 2 data for one GOP is stored in the buffer 41 in the splicing IC 11. The CPU 45 causes the SDRAM 43 to record the stored data from the buffer 41 through the BAC 42. The CPU 45 extracts the GOP displaced amount PTS_FS from the Audio_Header 63 of the local header 60 of the block stored in the SDRAM 43. The displaced amount PTS_FS is the one computed at the step S6 in FIG. 8 and is stored in the Audio_Header 63 at the step S10.

At a step S32, the CPU 45 calculates PTS_VIDEO_LAST (FIG. 6) of the video data from the data stored in the SDRAM 43 by using the following equation:

$$PTS\_VIDEO\_LAST = Video\_DTS + N \times 3003 \quad (5)$$

Here, "N" in the equation is the number of video frames included in one GOP (generally, N=15, and the values is written as one of video encode parameters (FIG. 7) of the Video_Header 62). The "3003" is a length of one video frame, and the value is also written as one of the video encoder parameters (FIG. 7) of the Video_Header 62.

When the splicing processing starts, the CPU 45 counts the number of GOP's from the initial value zero (0) at the beginning of the first input video data. Then, an STC value corresponding to the number of GOP's counted until then is the time stamp Video_DTS. Therefore, the time stamp Video_DTS represents a position of the end of the last video frame of the previous GOP. The PTS_VIDEO_LAST indicates a time of the end of the next GOP, which is output subsequent to the previous GOP directly.

At a step S33, the CPU 45 calculates the PTS_AUDIO_LAST (FIG. 6) by using the following equation:

$$PTS\_AUDIO\_LAST = Audio\_PTS + M \times 1152 \quad (6)$$

In the equation, "M" indicates a number of audio frames included in one GOP and, in this case, M=21. The "1152" indicates a length of one audio frame counted at a sampling frequency. In other words, the length of one audio frame is 24 msec. Therefore, when the length is counted at the sampling frequency of 48 kHz, 24 msec×48 kHz=1152. Each of these values M and 1152 is written as one of the various audio encode parameters (FIG. 7) of the Audio_Header 63.

Also for the time stamp Audio_PTS, when the splicing, processing starts, the CPU 45 counts the number of GOP's (corresponding to video data GOP's) from the initial value zero (0) at the beginning of the first input video data. Then, an STC value corresponding to the number of GOP's counted until then is the time stamp Audio_PTS. Therefore, the time stamp Audio_PTS represents a position of the end of the last audio frame of the previous GOP. The PTS_AUDIO_LAST indicates a time of the end of the next GOP, which is output subsequent to the previous GOP directly.

At a step S34, the CPU 45 calculates the displaced amount PTS_FS_SPLYCE (FIG. 6) by using the values calculated at the steps S32 and S33 and the following equation:

$$PTS\_FS\_SPLYCE = PTS\_AUDIO\_LAST - PTS\_VIDEO\_LAST \quad (7)$$

As described with reference to FIGS. 5 and 6, the PTS_FS_SPLYCE is a value indicating a gap amount at the end of the last video frame and audio frame of the previous GOP when the next GOP is spliced directly with the previous GOP.

By using the PTS_FS_SPLYCE value for the gap amount obtained based on the equation, following determination is performed. In other words, at a step S35, the CPU 45 determines whether or not the gap amount PTS_FS extracted at the step S31 is larger than the gap amount PTS_FS_SPLYCE computed at the step S34.

The determination will be described with reference to FIG. 10. The gap amount PTS_FS is a gap amount required for synchronizing a video frame and an audio frame at the beginning of the first GOP of the second program, as described above.

Figure 10:
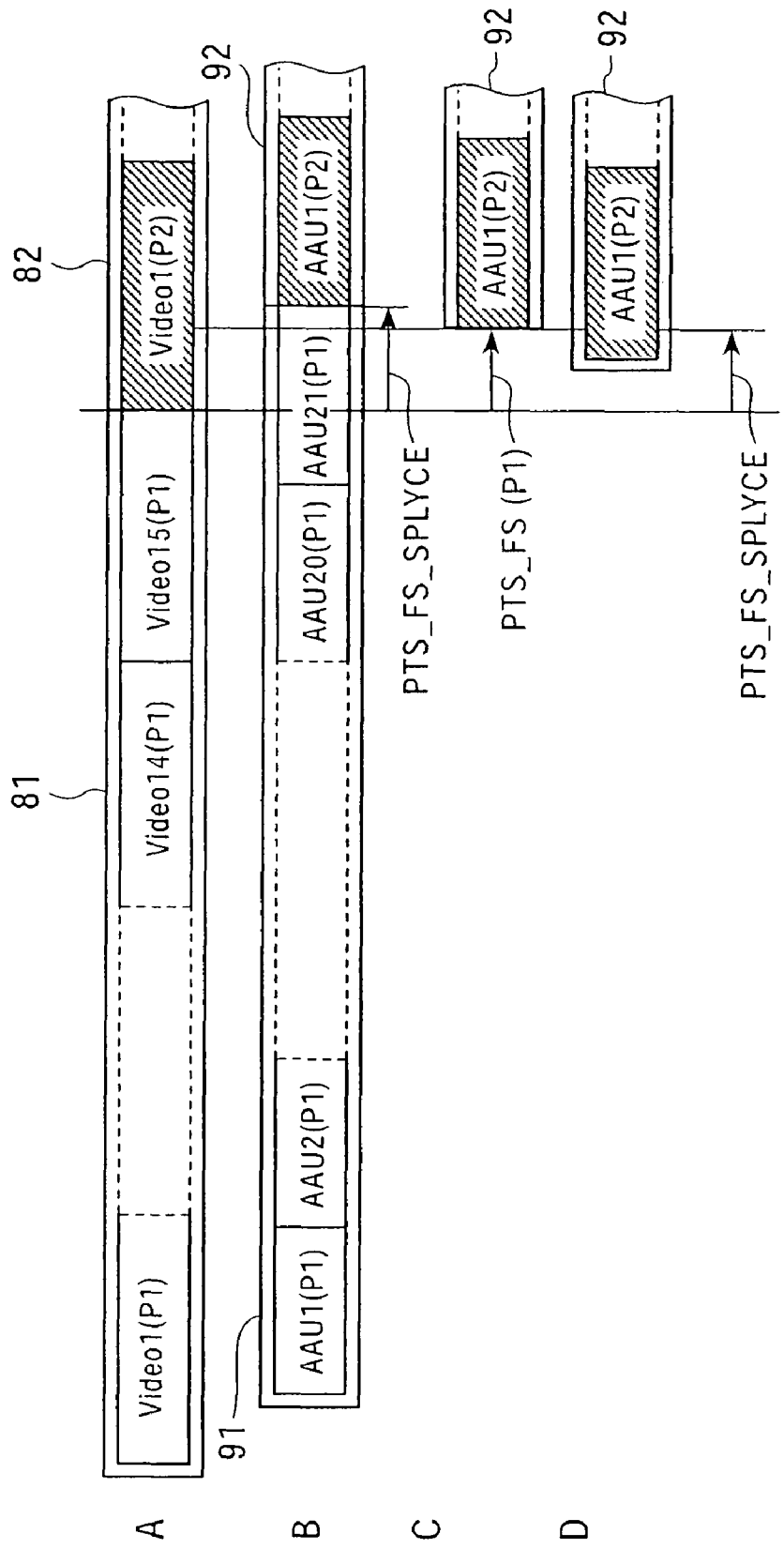
FIG. 10 is a diagram for explaining processing performed at a step S35 in FIG. 9.

In FIG. 10, a square block without hatching indicates video frames (Video 1 (P1) to Video 15 (P1)) of the last GOP (previous GOP) 81 included in the previous program (first program) (FIG. 10A) or audio frames (AAU 1 (P1) to AAU 21 (P1)) of the last GOP (previous GOP) 91 included in the previous program (first program) (FIG. 10B). The square block with hatching indicates the first video frame (Video 2 (P2)) of the first GOP (the GOP following the previous GOP) 82 included in the next program (second program) (FIG. 10A) or the first audio frames (AAU 1 (P2)) of the first GOP (the GOP following the previous GOP) 92 included in the next program (second program) (FIG. 10B).

As a result of the splicing, when the first audio frame (AAU 1 (P2)) of the first GOP 92 included in the next program (second program) is placed at a position shown in FIG. 10C, that is, when the gap amount PTS_FS_SPLYCE is equal to the gap amount PTS_FS, the audio frame can be synchronized with the video frame.

As shown in FIG. 10D, as a result of the splicing, when the audio frame is positioned in time before the position where the audio frame can be synchronized with the video frame (a state where the phase is advanced), a human being watching and listening the corresponding image and voice at the same time may feel something wrong.

On the other hand, as shown in FIG. 10B, when the audio frame is positioned in time after the position synchronized with the video frame (FIG. 10C) (a state where the phase is delayed), a human being feels something wrong less than the case where the audio frame is positioned in time before the synchronized position.

The processing at the step S35 determines whether the audio frame is positioned in time before the position synchronized with the video frame (a state where voice precedes the image) or after (a state where voice is delayed with respect to the image).

At the step S35, if it is determined that the gap amount PTS_FS_SPLYCE is smaller than the gap amount PTS_FS, that is, if the state as shown in FIG. 10D (the state where voice precedes the image) is identified, the processing goes to a step S37. There, the CPU 45 inserts (adds) one mute frame (mute AAU) to an audio frame. After that, the original audio frame is spliced. The mute audio frame may be created in advance. Alternatively, the mute audio frame may not be created but be obtained in advance. Then, the mute audio frame may be held in the splicing IC 11, and the held mute frame may be read out as necessary.

On the other hand, at the step S35, if it is determined that the gap amount PTS_FS_SPLYCE is not smaller than the gap amount PTS_FS, that is, if the state as shown in FIG. 10B is identified (a state where voice is delayed from the image), the processing goes to a step S36. At the step S36, the CPU 45 outputs the audio frame as it is (without inserting a mute frame).

After processing at the step S36 or S37, the processing goes to a step S38. At the step S38, the CPU 45 determines whether or not the gap amount PTS_FS_SPLYCE is larger than a sum of a length AAU_SIZE of one audio frame (encoding unit) and the gap amount PTS_FS (that is, whether or not the gap amount PTS_FS_SPLYCE is larger than the gap amount PTS_FS and the difference is larger than the length AAU_SIZE of one audio frame).

Figure 11:
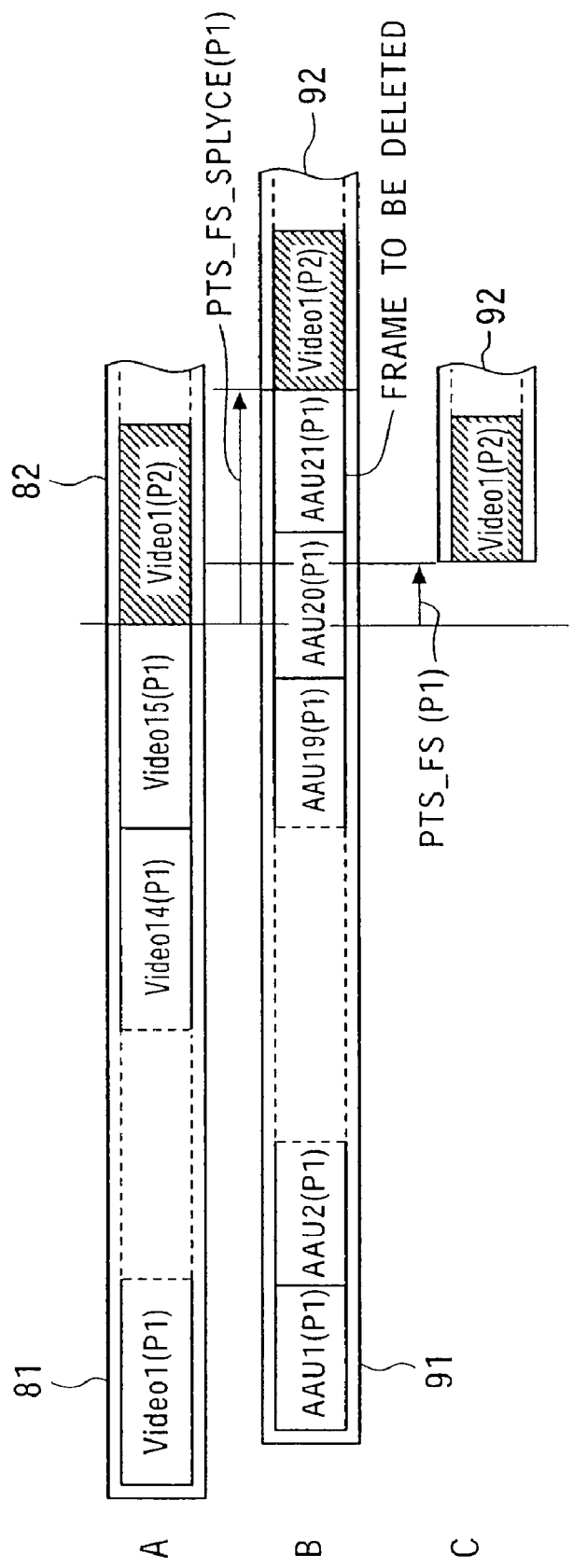
FIG. 11 is a diagram for explaining processing performed at a step S38 in FIG. 9.

The determination at the step S38 will be described with reference to FIG. 11. Like FIG. 10, a square block without hatching indicates video frames (Video 1 (P1) to Video 15 (P1)) of the last GOP (previous GOP) 81 included in the previous program (first program) (FIG. 11A) or audio frames (AAU 1 (P1) to AAU 21 (P1)) of the last GOP (previous GOP) 91 included in the previous program (first program) (FIG. 11B). The square block with hatching indicates the first video frame (Video 2 (P2)) of the first GOP (the GOP following the previous GOP) 82 included in the next program (second program) (FIG. 11A) or the first audio frames (AAU 1 (P2)) of the first GOP (the GOP following the previous GOP) 92 included in the next program (second program) (FIG. 11B).

As a result of splicing, when the first audio frame (AAU 1 (P2)) of the next GOP 92 is placed at a position shown in FIG. 11C, that is, when the gap amount PTS_FS_SPLYCE is equal to the gap amount PTS_FS, the audio frame is synchronized with the video frame.

As shown in FIG. 11B, because of the last frame of the previous GOP 91, the displaced amount from the state where the audio frame and the video frame are synchronized (FIG. 11C) is equal to or longer than one audio frame. When the delay of the audio frame from the video frame is one audio frame or longer, a human being can recognize the delay and feel something wrong.

Thus, at the step S38, if it is determined that the gap amount PTS_FS_SPLYCE is larger than a sum of the length AAU_SIZE of one audio frame and the gap amount PTS_FS, that is, as shown in FIG. 11B, when it is determined that a difference between the gap amounts is equal to one audio frame or longer, the processing goes to a step S39. There, the CPU 45 deletes D audio frames (where D is a number when the gap amount is shorter than one audio frame) in one GOP. The value D is calculated by using the following equation:

$$INT(D)=PTS\_FS\_SPLYCE/AAU\_SIZE \quad (8)$$

where INT(D) is a value of the integer part of the value D.

On the other hand, at the step S38, when it is determined that the gap amount PTS_FS_SPLYCE is not larger than a sum of the length AAU_SIZE of one audio frame and the gap amount PTS_FS, the processing at the step S39 is skipped.

The processing at the steps S38 and S39 are optional and may be omitted. However, the processing at the steps S38 and S39 are preferably performed so as to suppress the accumulation of gap amounts naturally.

In this way, the splicing processing for one GOP is completed. The data for one GOP having undergone the splicing processing is converted from the elementary stream to the transport stream by the CPU 45. After that, the data is packetized by the packet creating portion 44. Then, the data is converted to the DVB-ASI format by the DVB-ASI interface 10 through the buffer 46 and is output to the decoder 3. The decoder 3 decodes the input data and outputs the decoded data to an apparatus, not shown.

Figure 9:
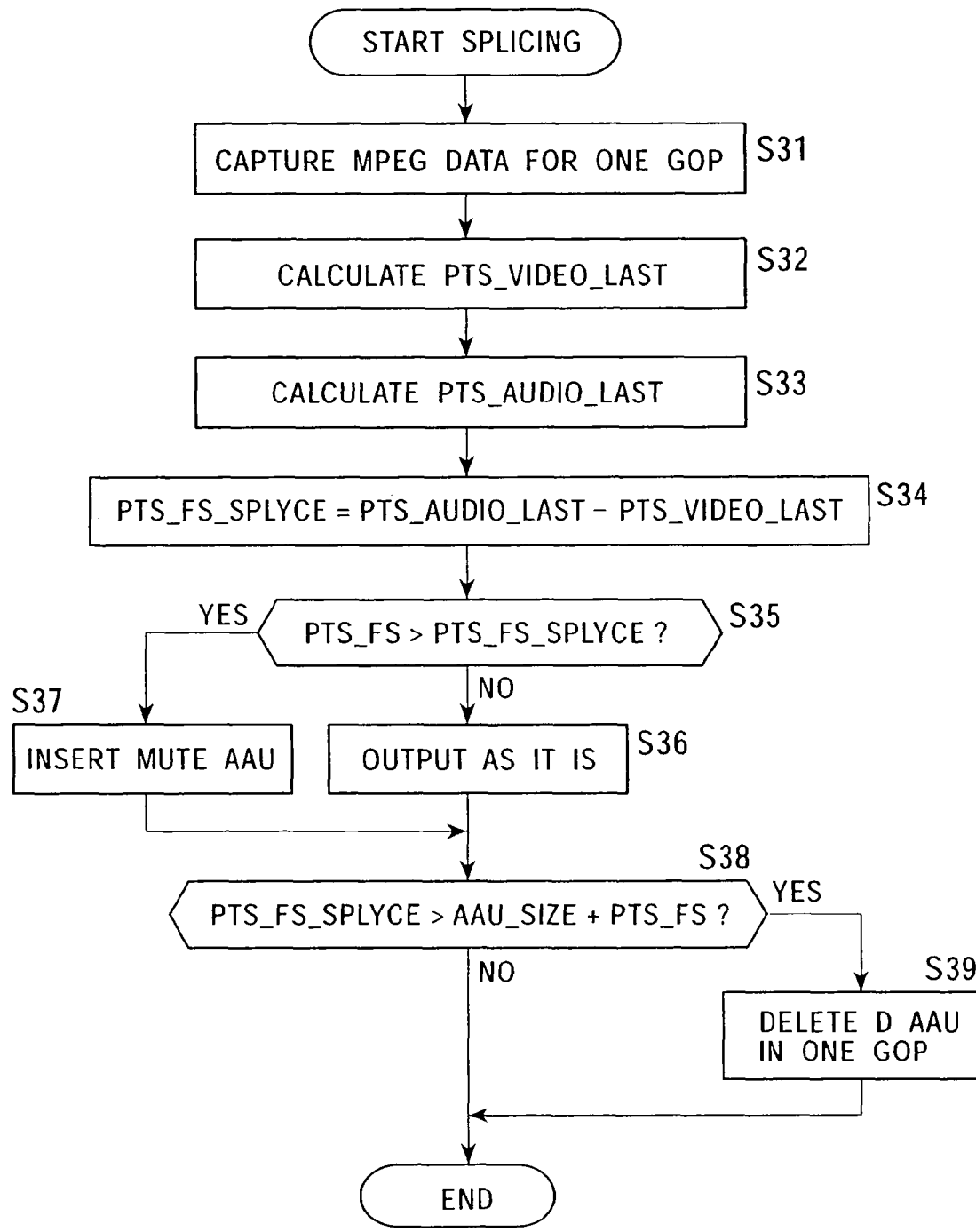
FIG. 9 is a flowchart for explaining splicing processing.

FIG. 9 only shows the processing for one GOP, but the above-described steps are repeated for every one GOP. Therefore, the splicing IC 11 can perform splicing processing effectively without recognizing changes in programs (that is, without performing processing for detecting that the first program is replaced by a different second program).

When it is determined that an audio frame is displaced ahead of the position synchronizing the corresponding video frame (preceding in time), one mute audio frame is inserted. When an audio frame is displaced behind the position synchronizing with the corresponding video frame and when it is determined that the displaced amount is equal to one encoding unit of audio data (one audio frame) or larger, the audio frame is deleted by encoding unit such that the displacement amount can be smaller than one encoding unit of audio data. Thus, the gap amount between an audio frame and a video frame can be prevented from being appreciable by audiences.

Next, processing performed when numbers of audio channels differ between programs to be spliced will be described. The processing performed when the numbers of audio channels differ, which will be described below, can be performed in parallel with the above-described recording processing or splicing processing. Alternatively, the processing can be performed independently from those kinds of processing.

Figure 12:
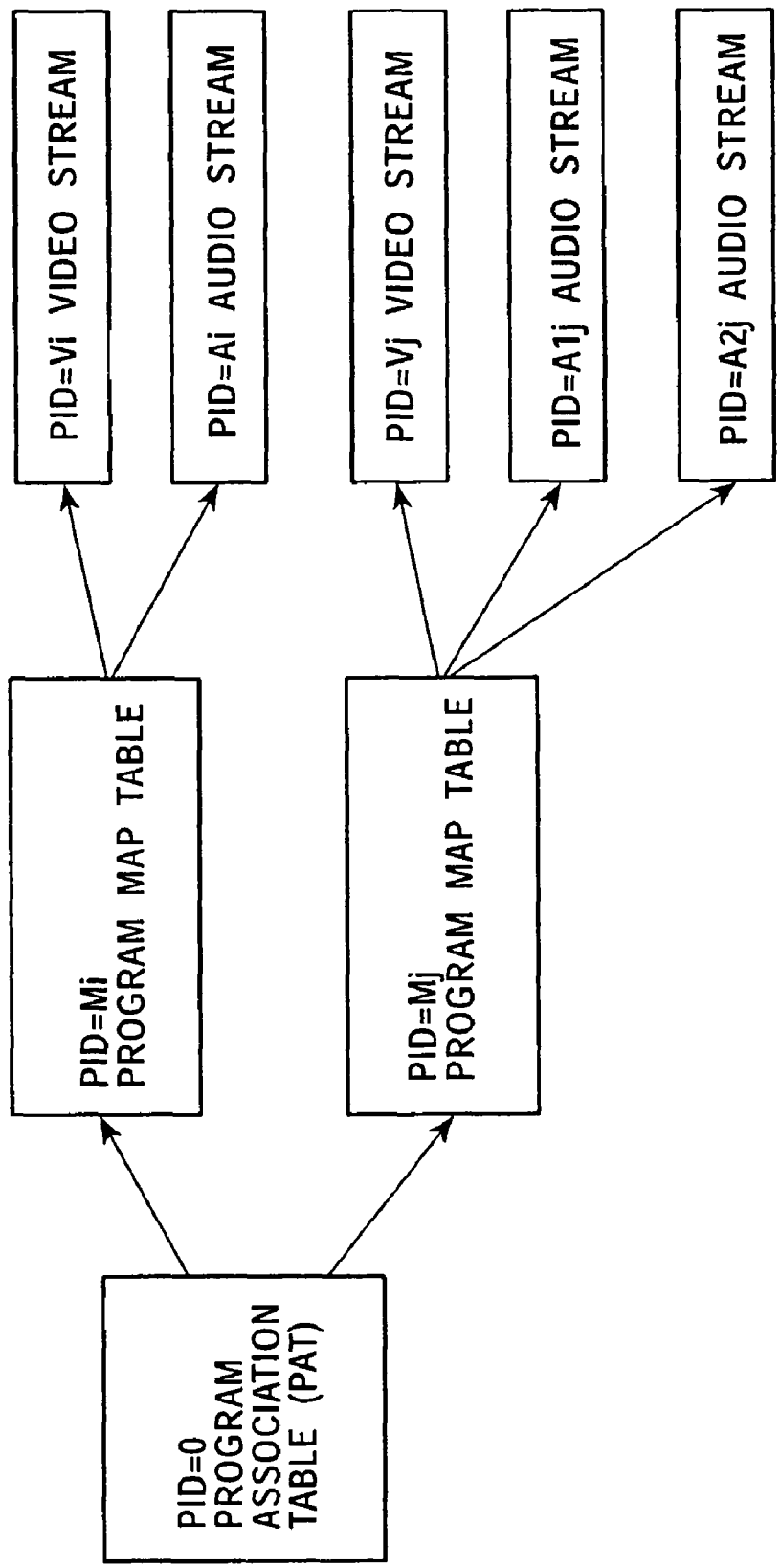
FIG. 12 is a diagram for explaining a hierarchical data construction of a transport stream.

FIG. 12 is a diagram for explaining a hierarchical data structure of a transport stream. Multiple programs are multiplexed in a transport stream. Also in one program, a video stream and an audio stream are multiplexed.

Multiplexing is performed by packetizing a video stream and an audio stream.

A packet including a program association table (PAT) is also transmitted to a transport stream at predetermined intervals. In an example in FIG. 12, a program ID (PID) of the program association table is zero (0). The PID of a program map table (PMT) is written in the program association table. In the example in FIG. 12, PID's, Mi and Mj, are written in the program association.

A packet including the program map table is also located in the transport stream at predetermined intervals. A PID of a stream included in a corresponding program is written in the program map table.

In the example in FIG. 12, a PID, Vi, of the video stream and a PID, Ai, of the audio stream are written in the program map table whose PID is Mi. A channel number of program whose PID is Ai is two (one block corresponds to stereo signals from two channels (right and left)). On the other hand, a PID, Vj, of the video stream is written in a program map table whose PID is Mj. In addition, a PID, A1*j*, of the audio stream and a PID, A2*j*, of the audio stream are written in the program map table. An audio stream corresponding to a video stream whose PID is Bj is audio streams whose PID's are A1*j* and A2*j*. Therefore, the number of channels is four in total.

Figure 13:
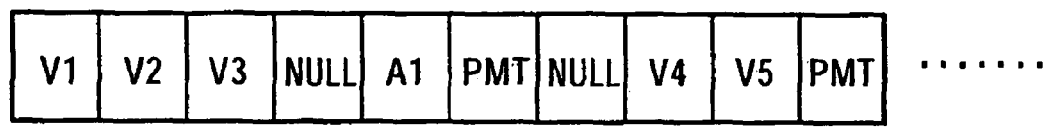
FIG. 13 is a diagram for explaining multiplexing transport streams.

A transport stream is a stream formed by multiplexing multiple packets in predetermined size (188 bytes), as shown in FIG. 13. Therefore, video data and/or audio data, which are MPEG 2 data, are divided in packet size and are multiplexed by the unit. In FIG. 13, "V1" and "V2" indicate video data divided in packet size. "A1" and "A2" indicate audio data divided in packet size. "PAT" and "PMT" indicate a packet (a packet having PID=0) describing the program association table in FIG. 12 and a packet (having PID=Mi or Mj) describing the program map table. "NULL" is a packet inserted for adjusting packet timing, and dummy data is stored therein.

The kind of packet to be transmitted among these packets is determined by the encoder 2 based on a data amount of transmitted data. In other words, if a data amount of video data to be transmitted is large at that time, the number of video packets is increased. On the other hand, a data amount of audio data is large, the number of audio data packets is increased.

Next, a case where the splicing IC 11 splices programs having different numbers of audio channels will be described with reference to FIG. 14. When two programs having different numbers of audio channels are spliced, the PID of one spliced program is changed in the middle (the splicing point forms the boundary).

Figure 14:
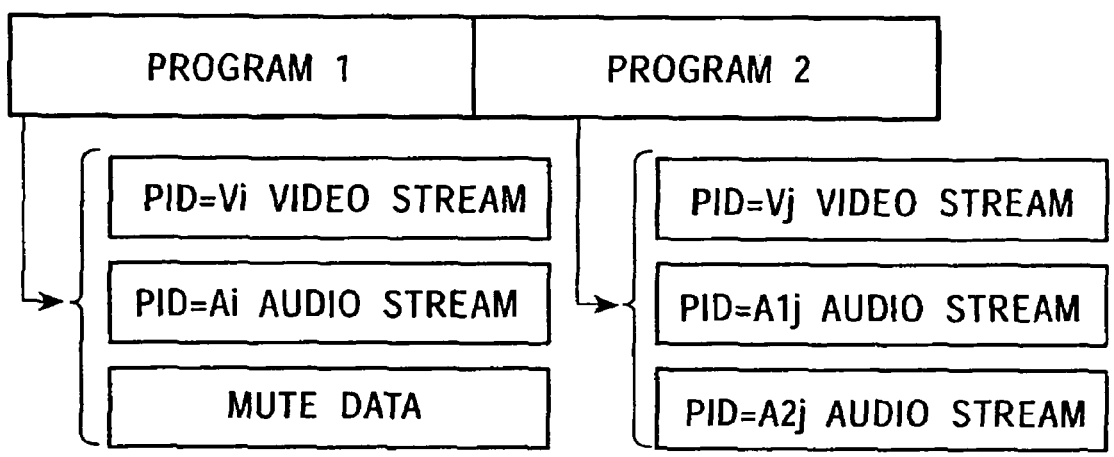
FIG. 14 is a diagram for explaining splicing programs having different numbers of audio channels.

In the example in FIG. 14, a program 1 to be spliced includes a video stream whose PID is Vi and an audio stream whose PID is Ai. In other words, the number of channels of the audio stream of the program 1 is two.

On the other hand, a program 2 to be spliced with the program 1 includes a video stream whose PID is vj and further includes an audio stream whose PID is A1*j* and an audio stream whose PID is A2*j*. In other words, the number of channels of the audio stream of the program 2 is four.

Therefore, when the program 2 is spliced with the program 1, the number of audio channels is increased by two channels in the middle.

When the number of PID's is changed by increasing or decreasing the number of audio channels, some decoders each for processing a transport stream may generate a channel, which cannot reconstruct from the beginning in timing of recognizing the change of PID's.

Thus, when the number of audio channels of an input signal is smaller than the maximum number of audio channels processable by the CPU 45, the CPU 45 increases the number of audio channels such that the number of audio channels can be equal to the number of the maximum audio channels processable by the CPU 45. Then, mute packets are output to the increased channels. As a result, since the number of channels is not increased, the decoder can reconstruct audio data of all of the channels from the beginning properly.

Next, processing for adjusting a channel number will be described with reference to FIG. 15 where a number of audio channels is changed before and after splicing performed by the splicing IC 11. This processing is performed in parallel with the splicing processing in FIG. 9. This processing starts when data is read from the HDD 6, input to the PCI interface 12 through the bus 5, and input to the splicing IC 11 through the contact P of he switch 14 and the DVB-ASI interface 10.

At a step S51, the CPU 45 captures data read from the HDD 6 in the local format to the SDRAM 43 through the buffer 41 and the BAC 42. As described with reference to FIG. 8, the CPU 45 converts the data to the data in the local format formed in block as shown in FIG. 7 for recording the data in the HDD 6. The data to be captured is data in the local format.

At a step S52, the CPU 45 analyzes the local header 60 (FIG. 7). At the step S52, the number of audio channels is mainly checked. As described above, the number of audio data channels is written in the Audio_Header 63 of the local header 60 as one of various Audio encode parameters. The CPU 45 reads the number of audio channels written in the. Audio_Header 63 and sets the number in P_CH.

At a step S53, the CPU 45 determines whether or not a difference, MuteCH_NUM, obtained by subtracting the number P_CH of audio channels set by the processing at the step S52 from the maximum number, MuxCH, of audio channels, which can be handled by the CPU 45 (that is, the video server 1) is zero (0).

At a step S53, if it is determined that the difference MuteCH_NUM is not zero (0), the processing goes to a step S54. At the step S54, the CPU 45 increases the number of channels by the number of channels calculated based on the MuxCH-P_CH, that is, the difference MuteCH_NUM between the maximum number MuxCH of audio channels and a number P_CH of audio channels used at that time for the header analysis. Then, the CPU 45 provides mute audio packets to the increased channels, converts them to a transport stream and sends it to the decoder 3. In the example in FIG. 14, two audio channels of mute data are provided to the program 1.

In this way, by keeping the state where the maximum number of channels are always used by sending mute audio packets, a state can be avoided where audio data (or video data waited for all of audio data) cannot be read from the beginning.

On the other hand, at the step S53, if it is determined that the difference MuteCH_NUM is zero (0), that is, when the maximum number MuxCH of audio channels is equal to the number P_CH of audio channels as a result of the header analysis, the channels (MuteCH_NUM) for outputting mute data is determined as not necessary. Then, the processing at the step S54 is skipped.

Figure 15:
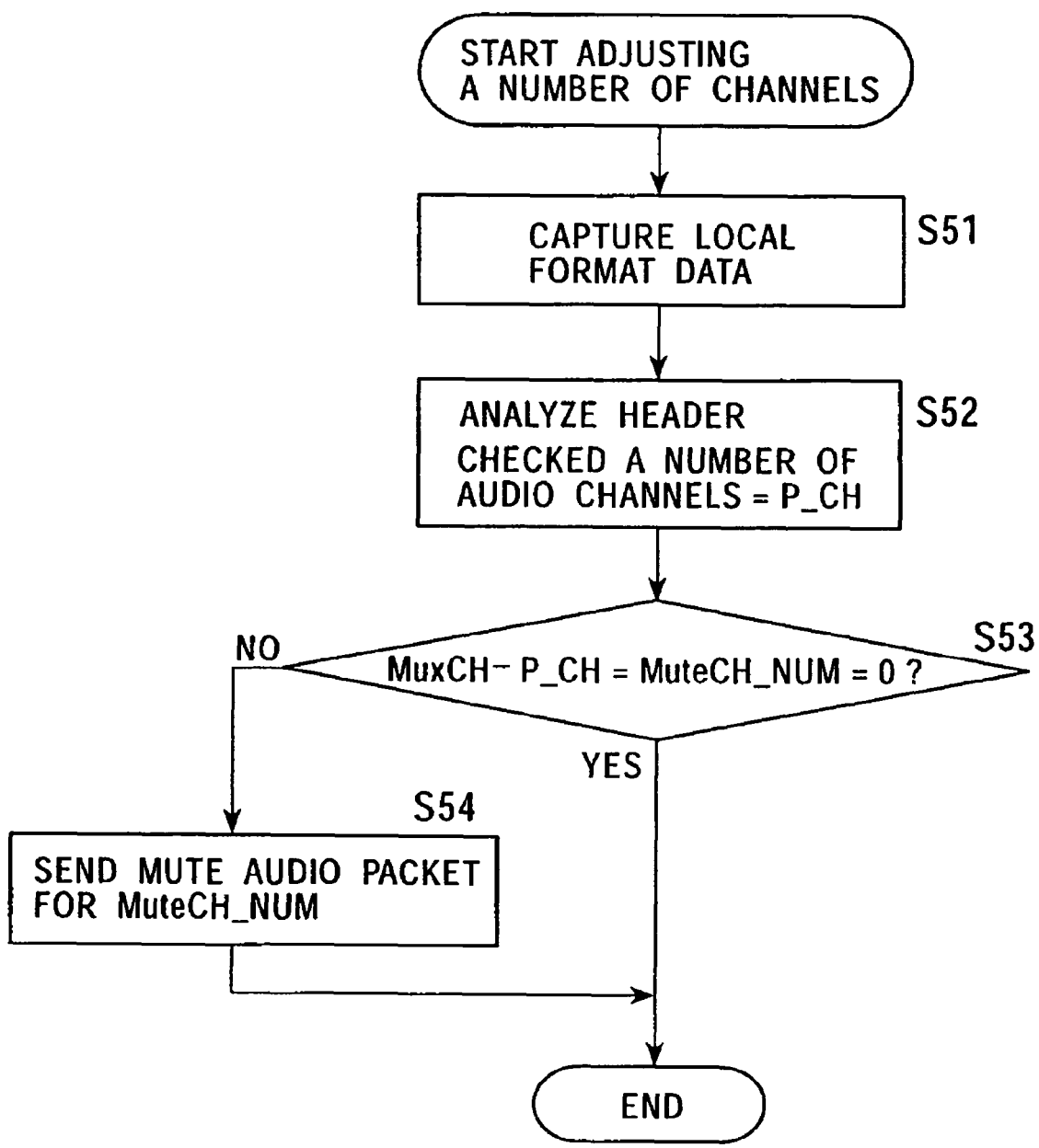
FIG. 15 is a flowchart for explaining processing for adjusting a number of channels when splicing programs having different numbers of audio channels.

The processing for adjusting the number of channels in FIG. 15 is performed on data to be reconstructed from the HDD 6. However, the data input from the encoder 2 or the other apparatus through the DVB-ASI interface 10 may be recorded in the HDD 6. Yet, performing the processing on data to be read from the HDD 6 can prevent essentially invalid data from being recorded in a memory area.

On the other hand, the SDI encode board 7 (FIG. 2) receives a video signal and an audio signal and then performs processing for adding a local header thereto and records them in the HDD 6. In other words, serial data is input to the SDI encode board 7. The serial data is decoded in the SDI decoder 21. Then, the video data and the audio data are encoded in the video encoder 22 and the audio encoder 23, respectively.

The CPU 25 of the SDI encode board 7 creates the local header 60 (FIG. 7) and stores the created local header 60 into the HDD 6 through the PCI interface 24 and the bus 5. On the other hand, the CPU 25 aligns a video elementary stream and an audio elementary stream in accordance with the format of the created local header and stores them in the HDD 6 sequentially.

In this way, for performing the splicing, by inserting a mute audio frame and/or by deleting an audio frame causing a displacement as large as one or more audio frame, the synchronization gap giving audiences a feel of wrongness can be prevented. Also, when the number of audio channels is changed before or after a splicing point, a mute audio packet may be output as described above. Thus, a problem that the audio data cannot be reconstructed from the beginning in the decoder can be avoided.

Since the above-described processing eliminates a need for identifying a splicing point of programs, the source code can be simplified.

The processing unit is GOP in the example, but a predetermined number of packets may be a processing unit.

A series of above-described processing may be implemented by hardware or may be implemented by software as described above. When the series of processing is implemented by software, programs constructing the software may be installed from a recording medium or the like in a computer built in specific hardware or a generic personal computer, for example, which can implement different kids of functions by installing programs.

FIG. 16 is a diagram showing an example of an internal construction of a personal computer for implementing the processing. A CPU (central processing unit) 101 of the personal computer implements different kinds of processing in accordance with programs stored in a ROM (read-only memory) 102. A RAM (random access memory) 103 stores data and/or programs required for implementing the different kinds of processing, as necessary. An input portion 106 including a keyboard and/or a mouse is connected to an input/output interface 105, which outputs a signal input to the input portion 106 to the CPU 101. An output portion 107 including a display and/or a speaker is also connected to the input/output interface 105.

A memory portion 108 including a hard disk and a communication portion 109 for communicating data with the other apparatus over a network such as the Internet are also connected to the input/output interface 105. The drive 110 is used for reading and writing data from/to a memory medium such as a magnetic disk 121, an optical disk 122, a magneto-optical disk 123 and a semiconductor memory 124.

As shown in FIG. 16, the recording medium may be a package medium, which is distributed for providing a program to a user separately from a personal computer, including the magnetic disk 121 (including a flexible disk), the optical disk 122 (including a CD-ROM (compact disk-read-only memory) and a DVD (digital versatile disk)), the magneto-optical disk 123 (including an MD (mini-disk) (registered service mark)) or the semiconductor memory 124. Alternatively, the recording medium may be a hard disk, which is built in a computer in advance, including the ROM 102 or the memory portion 108 storing a program.

The steps for writing a program provided by a medium may not be always performed in accordance with the described order herein or in time series but may be performed in parallel or independently.

What is claimed is:

1. An information processing apparatus for processing input video data in a processing unit and input audio data in a processing unit different from the processing unit for the input video data in size, comprising:

ending time information calculating means for calculating ending time information of the processing unit of the input video data and ending time information of the processing unit of the input audio data from the input video data in the processing unit and the input audio data in the processing unit;

first gap amount information calculating means for, when the input video data in the processing unit and the input audio data in the processing unit are spliced to previous processing units directly, calculating, for each of the processing units, first gap amount information indicating a gap amount between the input video data in the processing unit and the input audio data in the processing unit for synchronizing the input video data in the processing unit and the input audio data in the processing unit;

second gap amount information calculating means for calculating, for each of the processing units, second gap amount information indicating a gap amount between ending time information of the video data in the previous processing unit and the input audio data in the processing unit for synchronizing the input audio data in the processing unit and the input video data in the processing unit; and mute data inserting means for, when the second gap amount is larger than the first gap amount, inserting mute information indicating a mute between the previous audio data and the input audio data for each of the processing unit.

2. An information processing apparatus according to claim 1, further comprising:

determination means for determining whether or not a value of the first gap amount information is larger than a value of the second gap amount and a difference between the value of the first gap amount and information and the value of the second gap amount is equal to or more than one encoding unit of the audio data; and deletion means for deleting the audio data in the previous processing unit by the encoding unit included in the processing unit of the audio data such that the difference between the value of the first gap amount information and the value of the second gap amount can be smaller than one encoding unit of the audio data when the determination means determines that the value of the first gap amount information is larger than the value of the second gap amount and the difference is equal to or more than one encoding unit of the audio data.

3. An information processing method performed by a processor for processing input video data in a processing unit and input audio data in a processing unit different from the processing unit for the input video data in size, comprising the steps of:

calculating by the processor, ending time information of the processing unit of the input video data and ending time information of the processing unit of the input audio data from the input video data in the processing unit and the input audio data in the processing unit;

when the input video data in the processing unit and the input audio data in the processing unit are spliced to previous processing units directly, calculating by the processor, for each of the processing units, first gap amount information indicating a gap amount between the input video data in the processing unit and the input audio data in the processing unit for synchronizing the input video data in the processing unit and the input audio data in the processing unit;

calculating by the processor for each of the processing units, second gap amount information indicating a gap amount between ending time information of video data in the previous processing unit and the input audio data in the processing unit for synchronizing the input audio data in the processing unit and the input video data in the processing unit; and when the second gap amount is larger than the first gap amount, inserting, by the processor, mute information indicating a mute between the previous audio data and the input audio data for each of the processing unit.

4. A non-transitory recording medium storing a program for processing input video data in a processing unit and input audio data in a processing unit different from the processing unit for the input video data in size, said program comprising the steps of:

calculating ending time information of the processing unit of the input video data and ending time information of the processing unit of the input audio data from the input video data in the processing unit and the input audio data in the processing unit;

when the input video data in the processing unit and the input audio data in the processing unit are spliced to previous processing units directly, calculating, for each of the processing units, first gap amount information indicating a gap amount between the input video data in the processing unit and the input audio data in the processing unit for synchronizing the input video data in the processing unit and the input audio data in the processing unit:

calculating, for each of the processing units, second gap amount information indicating a gap amount between ending dine information of video data in the previous processing unit and the input audio data in the processing unit for synchronizing the input audio data in the processing unit and the input video data in the processing unit; and when the second gap amount is larger than the first gap amount, inserting mute information indicating a mute between the previous audio data and the input audio data for each of the processing unit.

5. A program embodied in a non-transitory computer-readable medium for processing input video data in a processing unit and input audio data in a processing unit different from the processing unit for the input video data in size, said program implementing the method comprising the steps of: calculating ending time information of the processing unit of the input video data and ending time information of the processing unit of the input audio data from the input video data in the processing unit and the input audio data in the processing unit; when the input video data in the processing unit and the input audio data in the processing unit are spliced to previous processing units directly, calculating, for each of the processing units, first gap amount information indicating a gap amount between the input video data in the processing unit and the input audio data in the processing unit for synchronizing the input video data in the processing unit and the input audio data in the processing unit; calculating, for each of the processing units, second gap amount information indicating a gap amount between ending time information of video data in the previous processing unit and the input audio data in the processing unit for synchronizing the input audio data in the processing unit and the input video data in the processing unit; and when the second gap amount is larger than the first gap amount, inserting mute information indicating a mute between the previous audio data and the input audio data for each of the processing unit.

* * * * *